July 19, 1960

C. A. GONGWER 2,945,343

CHARGE

Filed Nov. 16, 1953

INVENTOR.
CALVIN A. GONGWER

BY

D. Gordon Angus

ATTORNEY

July 19, 1960

C. A. GONGWER 2,945,343

CHARGE

Filed Nov. 16, 1953

INVENTOR.
CALVIN A. GONGWER
BY
*D. Gordon Angus*
ATTORNEY

United States Patent Office 2,945,343
Patented July 19, 1960

2,945,343
CHARGE
Calvin A. Gongwer, Glendora, Calif., assignor to Aerojet-General Corporation, Azusa, Calif., a corporation of Ohio
Filed Nov. 16, 1953, Ser. No. 392,080
11 Claims. (Cl. 60—35.5)

This invention relates to a solid, restricted burning lithium charge for torpedoes, rockets, turbines, and the like, and to apparatus for its use.

The reaction between lithium and water $$2Li + 2H_2O \rightarrow 2LiOH + H_2$$

proceeds vigorously with a considerable evolution of heat and gas. The energy released is of a high enough order to be useful in vaporizing water to steam, and the reaction is therefore potentially useful as a propellant or as a source of hot gases for a turbine. Previous attempts to utilize lithium metal have generally required the lithium to be molten to remain in continuous reaction. Such apparatus is complex and expensive, and such expense is particularly significant when the application is in an expendable unit such as a rocket or torpedo. Previous efforts with lithium met with only moderate success, partly because the lithium hydroxide tended to foul the mechanism used as well as the reacting face, slowing the reaction, and partly because of the manner in which the charge was enclosed.

It is an object of this invention to provide a charge of solid lithium which may be reacted with water in a restricted and progressive manner, so as to produce steam and hot gasses for work.

A feature of the invention resides in the provision of a cohesive solid charge of metallic lithium having a reacting face exposed so as to be contacted with water, the rest of the charge being closely enclosed, whereby the lithium and water react only at the face according to the above equation, and heat, steam and gases are produced.

An optional feature of the invention resides in a body of an alkali metal other than lithium, sodium for example, fixed to the exposed reactive face of the lithium, which body is first ignited by the water, and serves to facilitate and insure the ignition of the lithium, whereby the lithium-water reaction proceeds at an elevated temperature in self-sustained reaction.

Still another optional feature resides in the provision of a sprayer adapted to move along with the retreating exposed face of the charge as the charge is used up, whereby the face of the charge is contacted locally with a water spray at maximum force, this action reducing the surface concentration of lithium hydroxide on the reacting face.

Another optional feature is the provision of an extrusion device which extrudes the metallic lithium through an orifice whereby the exposed face remains substantially in the same position while the charge is being consumed.

These and other features of my invention will be fully understood from the following detailed description and the accompanying drawings, of which:

Figure 1:
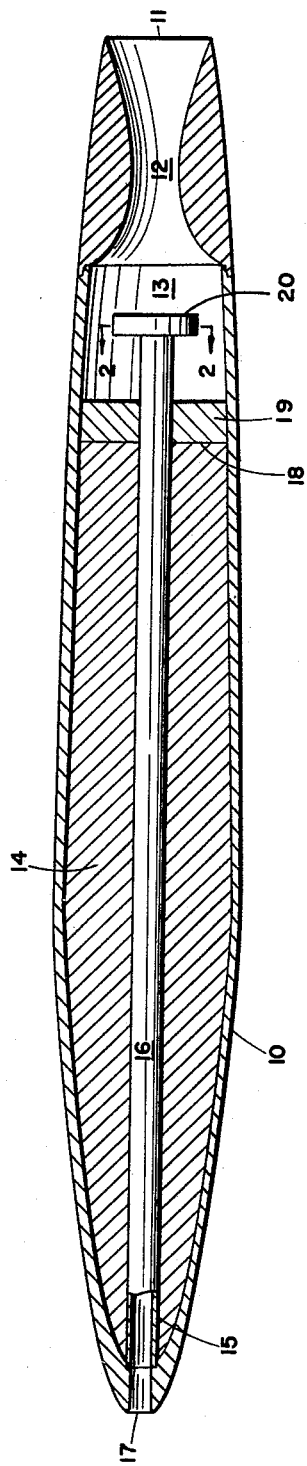
Fig. 1 is a plan view, partly in cross-section, of a jet-propelled missile according to the invention.

Referring now to the drawings, Fig. 1 shows the invention installed into a missile adapted to move through a body of water, acquiring its water supply therefrom. The missile comprises an outer streamlined shell or housing 10 with an exhaust port 11, nozzle 12 and reaction chamber 13.

The charge 14 comprises metallic lithium compacted to a solid cohesive mass inside the front of the shell. It has an annular shape with a central passage 15 to accommodate a conduit 16 which passes therethrough and connects with a ram-water duct 17 at the tip of the missile. As it is packed solidly into the missile, the lithium charge is substantially totally enclosed so that water will contact it only at its rear reacting face 18. An annular body of metallic sodium 19 is affixed to this rear reacting face of the lithium charge.

Figure 2:
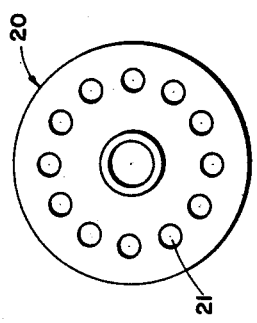
Fig. 2 is a cross-section taken at line 2—2 of Fig. 1.

A spray head 20 disposed rearward of the sodium and reacting face of the lithium is interconnected with the conduit 16, and has jets 21 which spray water toward the reactive face (Fig. 2).

Figure 3:
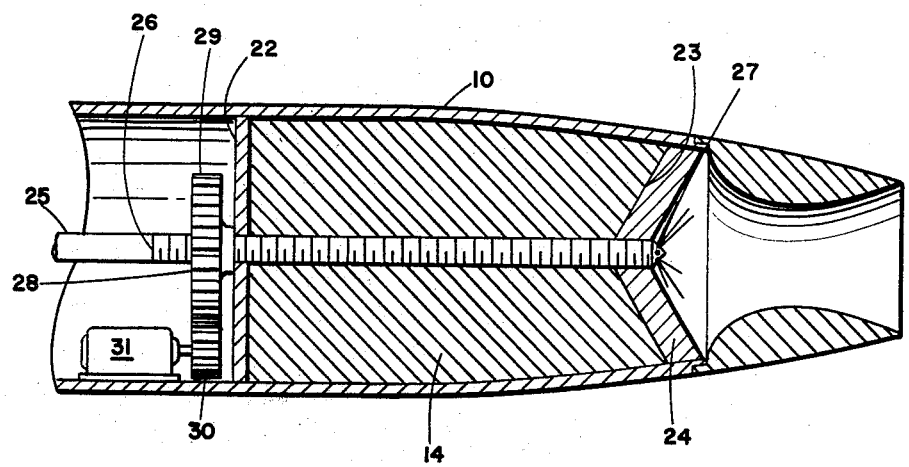
Fig. 3 is a view, partly in cross-section, of a preferred form of the charge of the invention, along with a fragment of a missile in which it is incorporated.

The embodiment of Fig. 3 is a preferred means for spraying water on the lithium, and shows the charge incorporated in the same outer structure. A bulkhead 22 extends across the interior of the shell, and the lithium is packed therein so it closely fits the sides. The lithium has a conically shaped reacting face 23 to which a body of sodium 24, also having a conical face, is fixed.

A ram-water conduit 25 having threads 26 on its outside wall and a plugged rearward end with jets 27 for directing the water in a conical spray similar in shape to that of the reacting face, passes through the bulkhead, and extends to the rear so that the spray jets are about even with the reacting face of the sodium. As in the previous embodiment, the conduit connects with a source of ram water.

Forward of the bulkhead, a nut 28 with gear teeth 29 on its outer periphery is threaded to the conduit and bears against the bulkhead. A matching gear 30 meshes with teeth 29, and is turned by driving means 31.

Figure 4:
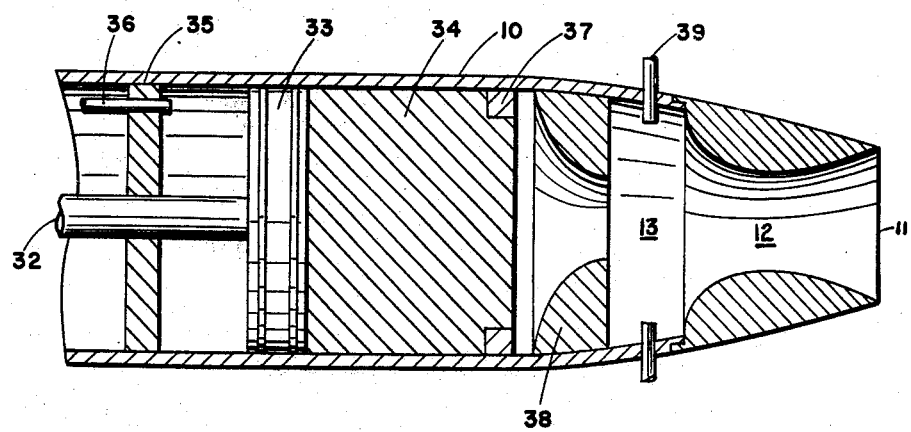
Fig. 4 is a view, partly in cross-section, of another form of the charge of the invention, also including a fragment of a missile in which it is incorporated.

Fig. 4 shows a lithium charge utilizing an extrusion principle, so that the reacting face of a substantially totally enclosed charge will remain nearly stationary. In this case, the shell 10 has an exhaust port 11, nozzle 12 and reaction chamber 13, but the ram water port, instead of providing water to the reacting face, acts to exert force on the push rod 32 connected to a piston 33 which is disposed between the lithium metal 34 and a bulkhead 35. A vent 36 through the bulkhead relieves any vacuum the piston might set up behind itself. As an optional means of extrusion, pressure may be introduced through vent 36 for moving the piston. An annular charge of sodium 37 is placed at the rear of the lithium. An extrusion nozzle 38 is positioned to the rear of the lithium and sodium, so that metal will be extruded into the reaction chamber 13. Sprayers 39 pierce the shell of the missile and admit water to the chamber near the exposed face, which is, of course, at the extrusion nozzle.

The operation of these embodiments of the invention will now be described. Lithium's reaction with water is perhaps the least violent of any of the alkali metals. Potassium, rubidium, and caesium react spantaneously on contact with water (even breaking into flame), while sodium's action is less pronounced, but still is violent, and if held from skidding about the surface will also ignite with a flame. Lithium reacts a little less violently than sodium, but undergoes vigorous reaction, particularly when it is molten to begin with. With proper design so that the reactants do not become excessively fouled with lithium hydroxide (one of the reaction products), and if its enclosure is properly designed, I have found that it is possible for a solid charge of lithium to remain in sustained reaction with water. One means of assuring ignition and a sufficient temperature on the reacting face to cause sustained reaction, is the affixation of a body of an alkali metal more reactive than lithium with water (sodium being a convenient substance) to the reacting face of the charge in each embodiment. While not entirely necessary for ignition, the use of this alkali metal as a trigger has resulted in a more reliable charge.

To start the missible of Fig. 1 in operation, it is only necessary to admit water to the reacting chamber. This water (which may be sea water) reacts with the sodium layer, creating hydrogen gas and releasing heat which vaporizes some of the water present. In a short time, the reacting chamber and nozzle will be cleared of its load of water, and the missile will begin to move under the impulse reaction. This causes water to pass through the conduit and the jets, spraying onto the reacting face where more gases are created. The spray head stands still in this embodiment while the reacting face retreats from it as the charge is consumed but as the device accelerates through the water, the spray is under greater ram pressure, assuring the reacting face of a sufficient water supply.

The device of Fig. 3 has been found to be preferable, although lacking in the simplicity of construction of that shown in Fig. 1. In this case, the design is such that the spray head proceeds forward, along with the reacting face, which retreats as the charge is consumed so as to maintain a substantially constant separation between them. As before, water admitted to the reacting chamber through the nozzle starts the reaction, and the driving means 31 for the conduit are also started. These may be such as a simple battery-driven motor. As the water is expelled from the reacting chamber, the missile begins to move, and ram water pressure forces a spray through the jets onto the conically shaped reacting face. The driving means turn the nut, and the conduit is pulled forward through the lithium at a rate determined by experiment for an individual form of charge. The conical, outwardly directed spray continually washes the reacting face of accumulated lithium hydroxide, and thus minimizes any slowing of the reaction due to mass-action effect. The only reaction occurs at the reacting face, since the lithium is totally enclosed on the other side.

In the embodiment of Fig. 4, water is admitted as before and begins its reaction with the sodium, and to a less significant degree with the lithium. This starts the motion of the missile, and the piston is forced backwards by the ram force, extruding the metals through the nozzle 38, where they flow into the reacting chamber. Water enters the chamber under static pressure through sprayers 39, which furnish water to the reaction, and wash the extruded portion of lithium hydroxide. As the sodium is placed in an annulus inside the extrusion chamber, it will be extruded before the lithium, thus causing the desired ignition. By this device, the spray is kept at the reacting face, by moving the metal to the stationary spray, rather than vice versa.

In all of the devices shown, water in excess of the stoichiometric requirements of the reaction is fed to the face so as to be vaporized by the heat of the reaction. When the sodium (or other alkali metal more reactive than lithium) has completed its reaction, it will be found that the reacting face of the lithium will have been raised to a high temperature by its contact with the sodium, assuring its ignition on contact with water, and reaction thereafter begins on the reacting face of the lithium. It will be noted that in all cases, the charge is substantially totally enclosed except for the reacting face, permitting closer control of conditions in the lithium.

One use for the heat and gases produced as shown is in means for jet propulsion, and for that reason, extra water was furnished to obtain a larger quantity of hot gases. The charge construction shown, including ignition means if they are desired, and means for supplying water to the reacting face, are applicable to any installation requiring hot gases for operation, turbines for example. In that type of use, it may be found necessary to pressurize the water flow, but in stationary installations, pressurized water supply lines are almost invariably available. Operation in the manner described above will thereupon produce quantities of steam and hot gas in amounts and at rates depending on charge size, reacting face areas, and water feed rate.

In all embodiments, the lithium charge is substantially totally enclosed so as to restrict access of water from all surfaces except the burning end of the charge, and cause it to react progressively along its length, and at a restricted rate.

Metals besides sodium may be used as igniters, the requirement being a greater violence of reaction with water than lithium. For this purpose, the alkali metals are especially suitable, and include, besides sodium, the elements potassium, rubidium, and caesium.

My invention is not to be construed as limited to the particular embodiments illustrated in the drawings and described in the description, which are given by way of illustration rather than of limitation, and the invention is not limited except in accordance with the scope of the appended claims.

I claim:

1. A device for producing propulsion comprising a housing having an exhaust nozzle, a substantially totally enclosed body of solid metallic lithium having an exposed reacting face within the housing, an inlet opening into the housing, a ram-water duct connected with said opening within the housing, and means for applying water from the duct to the reacting face, within the housing.

2. A device for producing propulsion comprising a housing having an exhaust nozzle, a substantially totally enclosed body of solid metallic lithium having an exposed reacting face within the housing, a body of metallic alkali metal other than lithium on the reacting face, an inlet opening into the housing, a ram-water duct connected with said opening within the housing, and means for applying water from the duct to the alkali metal and then to the reacting face of the lithium.

3. A device for producing propulsion comprising a housing having an exhaust nozzle, a substantially totally enclosed cohesive body of metallic lithium having an exposed reacting face within the housing, an inlet opening into the housing, a ram-water duct connected with said opening within the housing, a spray head within the housing, means for supplying water from the duct to the spray head whereby the water is sprayed outward on the reacting face from a point near its center, and means for moving the spray head toward the face at the rate at which the reacting face recedes whereby it is maintained at a substantially constant spacing from the reacting face as the lithium is consumed.

4. A device according to claim 3 in which a body of metallic sodium is fixed to the reacting face of the lithium.

5. A hydroduct motor comprising an outer casing having an exhaust nozzle at its rearward end and a water inlet opening at its forward end, a ram-water duct leading from said inlet opening to a spray head located inside said casing, and a body of solid metallic lithium residing within said casing and forward of said spray head, said body of solid metallic lithium having an exposed rearward face while otherwise being enclosed by said casing, said spray head being so arranged as to apply water to the exposed rearward face of said body of solid metallic lithium.

6. A hydroduct motor according to claim 5 in which a body of metallic sodium is fixed to the reacting face of the lithium.

7. A hydroduct motor comprising an outer cylindrical casing having an exhaust nozzle at its aft end and at its fore end a ram-water duct which is connected to a central conduit extending axially through the interior of said casing to a spray head, and a body of solid metallic lithium residing within said casing and about said central conduit and forward of said spray head, said body of solid metallic lithium having an exposed rearward face while otherwise being enclosed by said casing and said conduit, and said spray head being so arranged as to apply water to the exposed rearward face of said body of solid metallic lithium.

8. A hydroduct motor according to claim 7 in which a body of metallic sodium is fixed to the reacting face of the lithium.

9. A hydroduct motor comprising an outer cylindrical casing having an exhaust nozzle at its aft end and at its fore end a ram-water duct which is connected to a central conduit extending through the interior of said casing to a spray head, said conduit having threads about its exterior surface which mesh with a motor driven-gear for retracting said conduit at a given rate, and a body of solid metallic lithium residing between said casing and said central conduit and forward of said spray head, said body of solid metallic lithium having an exposed rearward face while otherwise being enclosed by said casing and said conduit, and said spray head being so arranged as to apply water to the exposed face of said body of solid metallic lithium.

10. A hydroduct motor according to claim 9 wherein the spray head is located near the center of the exposed rearward face of said body of solid metallic lithium and said spray head is so arranged as to spray water outwardly onto said exposed rearward face.

11. A hydroduct motor according to claim 10 in which a body of metallic sodium is fixed to the reacting face of the lithium.

References Cited in the file of this patent

UNITED STATES PATENTS

| | | |
|---|---|---|
| 1,423,330 | Kasley | July 18, 1922 |
| 2,563,265 | Parsons | Aug. 7, 1951 |
| 2,627,160 | MacDonald | Feb. 3, 1953 |
| 2,706,890 | Schmidt | Apr. 15, 1955 |

OTHER REFERENCES

"The Journal of Space Flight," published by the Chicago Rocket Society, vol. 2, No. 10, December 1950, pages 3 to 5.